United States Patent [19]
Iwamoto et al.

[11] Patent Number: 5,695,198
[45] Date of Patent: Dec. 9, 1997

[54] SEAL CONTAINING AGE RESISTORS FOR ROLLING BEARING

[75] Inventors: Akira Iwamoto; Norihiro Aoki; Kenji Okuma; Takahiko Uchiyama; Toshimi Takajo; Toshikazu Yabe, all of Kanagawa, Japan

[73] Assignee: NSK Ltd., Tokyo, Japan

[21] Appl. No.: 645,407

[22] Filed: May 13, 1996

[30] Foreign Application Priority Data

May 11, 1995 [JP] Japan ............................. HEI 7-113274
May 8, 1996 [JP] Japan ............................. HEI 8-113716

[51] Int. Cl.$^6$ ............................................. F16J 15/32
[52] U.S. Cl. ........................... 277/152; 277/DIG. 6; 384/482
[58] Field of Search ........................ 277/152, 53, 170, 277/171, 96, 96.2, 95, DIG. 6; 384/477, 478, 479, 482–487, 489, 130, 131, 135–138, 140–143, 145–153; 525/329.4

[56] References Cited

U.S. PATENT DOCUMENTS

| | | | |
|---|---|---|---|
| 3,985,707 | 10/1976 | Shell | 260/45.75 N |
| 3,987,054 | 10/1976 | Butula | 260/309 |
| 4,386,181 | 5/1983 | Kotani et al. | 524/304 |
| 5,282,689 | 2/1994 | Imamura et al. | 384/492 |
| 5,380,571 | 1/1995 | Ozawa et al. | 428/36.9 |
| 5,383,728 | 1/1995 | Micca et al. | 277/152 |
| 5,391,300 | 2/1995 | Webb et al. | 210/670 |

FOREIGN PATENT DOCUMENTS 58-18374  4/1982  Japan.

OTHER PUBLICATIONS

Journal of The Society of Rubber Industry, Japan, vol. 63, pp. 625–637 (1990).
Journal of The Society of Rubber Industry, Japan, vol. 68 pp. 335–347 (1995).
Rubber Industry Index (Fourth Edition) published by Journal of The Society of Rubber Industry, Japan in Jan. of 1994, p. 433.
Seals and Sealing Handbook, 34rd Edition, 1990.

Primary Examiner—Scott Cummings
Attorney, Agent, or Firm—Sughrue, Mion, Zinn, Macpeak & Seas, PLLC

[57] ABSTRACT

In a seal for a rolling bearing, the seal has a molding member formed from a rubber material, the molding member including a lip portion, the molding member having 0.3 to 5.0 MPa of tensile stress at 10% strain and no less than 50% of elongation at break after the rubber material is subjected to an accelerated air aging at 130° C. for 1000 hours. The rubber material includes the nitrile rubber compound containing a raw-material rubber, with respect to 100 weight parts of the raw-material rubber, 0.3 to 5.0 weight parts of an age resistor, and 0.3 to 5.0 weight parts of at least one secondary age resistor. The seal prevents grease enclosed in the rolling bearing from leaking out, the lip portion from being broken, and dust resistance from being lowered even in the case where the rolling bearing is used in a high-temperature environment.

4 Claims, 1 Drawing Sheet

SEAL CONTAINING AGE RESISTORS FOR ROLLING BEARING

BACKGROUND OF THE INVENTION

The present invention relates to a seal for a rolling bearing which is used in a rotation supporting portion of an electromagnetic clutch employed in a car alternator, a car air-conditioner, or the like. More particularly, the present invention relates to a contact rubber seal for a rolling bearing in which the seal can prevent grease from leaking and a lip portion from breaking even in an environment of high temperature and high speed, and in which the life of the rolling bearing is improved in an environment having a large amount of floating dust.

Generally, a rolling bearing includes outer and inner races, and optionally a seal attached between the outer and inner races. The seal is mounted to prevent grease which is in a portion of the bearing where the rolling elements are and dust generated during operation of the bearing from leaking out toward the outside, and to the contrary, in order to prevent dust floating in the outside from entering the portion of the bearing where the rolling elements are located FIG. 1 shows an example of a rolling bearing with such a seal.

The rolling bearing shown in FIG. 1 is a double sealed bearing which includes two seals on its opposite sides. Each of the seals 1 includes a race-like core 2 having a hook portion on its outer circumference and an elastic member 3 integrally formed on the outside of the race-like core by vulcanization of synthetic rubber. In view of functional requirements, the seal 1 further includes an annular main portion 11 which is formed from the core except the hook portion and the elastic member on the outside of the core, and a fitting portion 12 such as a caulking portion formed from the hook portion of the core and the elastic member on the outside of the core and locked by a stop groove 41 in the inner surface of an outer race 4, and a lip portion 13 formed from the elastic member on the inner circumferential side of the core and contacted with a reception groove 51 in the outer circumferential surface of an inner race 5.

Each seal 1 is disposed between the outer and inner races 4 and 5 of the rolling bearing by pushing the fitting portion 12 into the stop groove 41 on the inner circumferential surface of the outer race and deforming the fitting portion 12 elastically, with the lip portion 13 contacted with the reception groove 51 in the outer circumferential surface of the inner race.

Such seals are made from general materials of a steel plate such as SPCC, SECC, or the like for the core, and synthetic rubber such as nitrile rubber, acryl rubber, silicone rubber, fluoro rubber, or the like for the elastic member which forms the lip portion.

Because the elastic member of the seals is formed from synthetic rubber, there arises a so-called deterioration phenomenon in which the elastic member is hardened or toughness thereof is deteriorated, or the lip portion is deformed during operation of the rolling bearing in a high-temperature environment. As a result, there arise problems in that grease enclosed in the bearing is leaked out, the lip portion of the seal is broken, and the tightness of the fit of the lip portion with the inner race is reduced to cause lowering of dustproof characteristic of the seal.

SUMMARY OF THE INVENTION

The present invention has been achieved in view of conventional problems and an object thereof is to provide a rolling bearing seal in which not only grease enclosed in a bearing is prevented from leaking out but also a lip portion of the seal is prevented from being broken even during operation of the rolling bearing in a high-temperature environment.

To achieve the foregoing object, the present invention provides a seal for rolling bearing which includes a lip portion of a molding member formed from a rubber material in which the molding member exhibits tensile stress in a range of from 0.3 to 5.0 MPa at 10% strain after the rubber material is subjected to an accelerated air aging test at 130° C. for 1000 hours and exhibits no less than 50% of elongation at break after the accelerated air aging test.

According to the rolling bearing seal of the invention, there is no possibility of leaking grease enclosed in the bearing even in the case where the bearing is used in a high-temperature environment of 130° C. because the molding member forming the lip portion of the seal exhibits tensile stress of from 0.3 to 5.0 MPa at 10% strain after the application of an accelerated air aging test at 130° C. for 1000 hours.

If the tensile stress at 10% strain exceeds 5.0 MPa, the tracking characteristic of the lip portion onto the outer circumferential surface of the inner race is deteriorated extremely to cause possibly leaking of grease enclosed in the bearing. If the tensile stress at 10% strain is smaller than 0.3 MPa, the lip portion cannot keep its dimensions because of centrifugal force caused by the rotation of the outer race of the bearing relative to the inner race of the bearing.

Further, because the elongation at break of the molding member is not smaller than 50% after the molding member is subjected to the same test, the lip portion is rarely broken even in the case where excessive force acts on the lip portion suddenly to deform the lip portion.

Incidentally, when the compression set of the molding member forming the lip portion of the seal is in a range of from 0 to 35% after the rubber material is compression-heated at 130° C. for 70 hours in accordance with JIS K 6262, there is no possibility of reducing the interference fit of the lip portion with the inner race so as to lower dust resistance of the seal even in the case where the bearing is used in a high-temperature environment of 130° C.

DETAILED DESCRIPTION OF THE INVENTION

Figure 1:
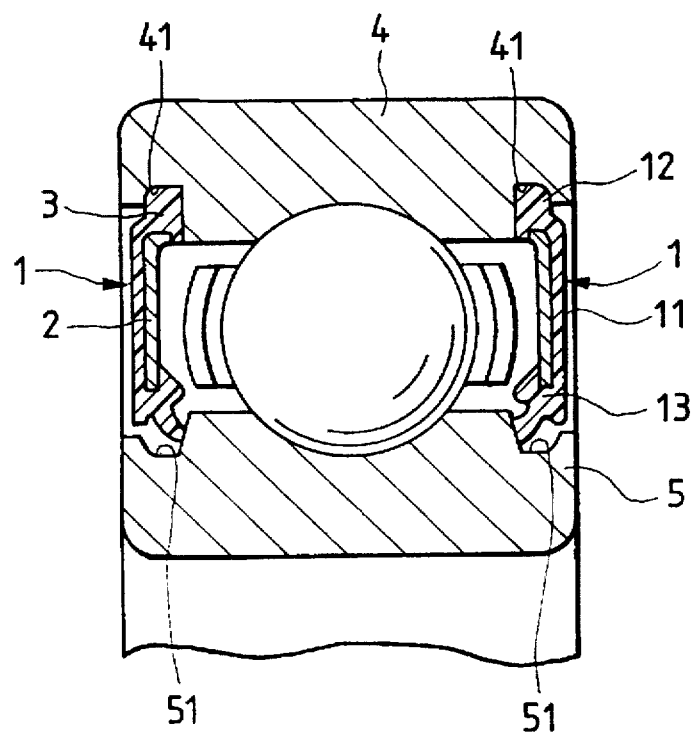
FIG. 1 is a sectional view showing an example of a rolling bearing with seals.

Description of a seal for a rolling bearing according to the present invention will be given below in detail with reference to the accompanying drawings.

The seal for the rolling bearing is made of a rubber material which is obtained by vulcanizing raw-material rubber formed from nitrile rubber which suitably adds a curing agent, a vulcanization accelerator, a vulcanization accelerator activator, an age resistor, a reinforcing agent, a plasticizer and a coupling agent to the raw-material rubber if necessary.

The nitrile rubber as raw-material rubber is selected from the group of low-nitrile-containing NBR, middle-nitrile-containing NBR, middle-high-nitrile-containing NBR, highnitrile-containing NBR, very-high-nitrile-containing NBR, and the like in accordance with the acrylonitrile content. The middle-high-nitrile-containing NBR is preferable from the viewpoints of thermal resistance, oil resistance and low-temperature resistance. Further, a copolymer containing an amino group or a phenyl group having an age resisting function may be used in order to improve the thermal resistance more greatly.

In the seal for the rolling bearing according to the present invention, if a rubber material is nitrile rubber compound which mixes various kinds of mixing agents to raw-material rubber containing nitrile rubber, the rubber material has a somewhat inferior thermal resistance but is preferable from the viewpoints of oil resistance, elasticity of rubber and cost of raw rubber.

The curing agent is selected from the group of sulfur such as powdered sulfur, sublimed sulfur, precipitated sulfur, high-dispersion sulfur, or the like; the group of sulfur compounds such as morpholine disulfide, alkylphenol disulfide, N,N'-dithio-bis(hexahydro-2H-azepinone-2), thiuram polysulfides, 2-(4'-morpholinodithio)benzothiazole, or the like; and dithiocarbamates. From the viewpoints of simple mixing and the thermal resistance, a small amount of the high-dispersion sulfur (surface treated sulfur) is preferable because of simple kneading into nitrile rubber, or morpholine disulfide is preferable.

The vulcanization accelerator is selected from the group of guanidine, aldehyde-amine, aldehyde-ammonia, thiazole, sulfenamide, thiourea, thiuram, dithiocarbamate, xanthate, and the like. In the case where a small amount of high-dispersion sulfur is mixed into nitrile rubber, the thiuram vulcanization accelerator of tetramethylthiuram disulfide is preferable, or it is preferable to use a mixture of sulfenamide accelerator of N-cyclobenzyl-2-benzothiazyl sulfenamide with thiazole accelerator of 2-mercaptobenzothiazole.

The vulcanization accelerator activator is selected from the group of metal oxides such as zinc oxide or the like, metal carbonates, metal hydroxides, fatty acids such as stearic acid or the like, and derivatives of the fatty acids, and amines.

The age resistor is selected from the group of amine-ketone condensates, aromatic secondary amine age resistor, monophenol derivatives, bis- or poly-phenol derivatives, hydroquinone derivatives, sulfur age resistor, phosphorus age resistor, and wax such as microcrystalline wax, or the like. It is preferable for amine-ketone age resistor of 2,2,4-trimethyl-1,2-dihydroquinoline polymer, reactants of diphenylamine and acetone, or aromatic secondary amine age resistor of N,N'-di-β-naphthyl-P-phenylenediamine, 4,4'-bis(α,α-dimethylbenzyl)diphenylamine and N-phenyl-N'-(3-methacryloyloxy-2-hydroxypropyl-P-phenylenediamine.

Further, in order to improve the thermal resistance more greatly, sulfur age resistor such as 2-mercaptobenzimidazole, 2-mercaptomethylbenzimidazole, zinc salt of 2-mercaptobenzimidazole, and zinc salt of 2-mercaptomethylbenzimidazole are preferable to being mixed as a secondary age resistor to the age resistor.

In particular, it is more preferable to mix the age resistor of 4,4'-bis(α,α-dimethylbenzyl)diphenylamine with at least one secondary age resistor selected from the group of 2-mercaptobenzimidazole, 2-mercaptomethylbenzimidazole, zinc salt of 2-mercaptobenzimidazole, and zinc salt of 2-mercaptomethylbenzimidazole.

Although a mixing content of the age resistor is not limited specifically, it is still further preferable to mix 0.3 to 5.0 weight parts of 4,4'-bis(α,α-dimethylbenzyl)diphenylamine as the age resistor with totally 0.3 to 5.0 weight parts of at least one secondary age resistor selected from the group of 2-mercaptobenzimidazole, 2-mercaptomethylbenzimidazole, zinc salt of 2-mercaptobenzimidazole, and zinc salt of 2-mercaptomethylbenzimidazole, with respect to 100 weight parts of the raw-material rubber in the case of the nitrile rubber compound containing acrylonitrilebutadiene polymer as the raw-material rubber. Because, if each mixing content of the age resistor and the secondary age resistor is not more than 0.3 weight parts, the sufficient thermal resistance cannot be obtained in the molding member. On the other hand, if each mixing content exceeds 5.0 weight parts to be mixed with the raw-material rubber, the further improvement of the thermal resistance is not recognizable, in addition, there is a possibility of increasing the compression set and extremely deteriorating an outside appearance of the seal.

The reinforcing agent is selected from the group of various kinds of carbon black, various kinds of silica, basic magnesium carbonate, activated calcium carbonate, special calcium carbonate, ultrafined magnesium silicate, hard clay, and the like. The carbon black or silica reinforcing agent is preferable from the viewpoint of reinforcing properties. In the case where the thermal resistance is more important, silica reinforcing agent is still preferable.

The plasticizer is selected from the group of phthalic acid derivatives such as di-(2-ethylhexyl)phthalate or the like, isophthalic acid derivatives, tetrahydrophthalic acid derivatives, adipic acid derivatives, azelaic acid derivatives, sebacic acid derivatives, dodecanoic acid derivatives, maleic acid derivatives, fumaric acid derivatives, trimellitic acid derivatives, pyromellitic acid derivatives, citric acid derivatives, itaconic acid derivatives, oleic acid derivatives, ricinoleic acid derivatives, stearic acid derivatives, phosphoric acid derivatives, glutaric acid derivatives, glycol derivatives, glycerol derivatives, paraffin derivatives, epoxy derivatives, polyester plasticizers, polyether plasticizers, liquid rubber, and the like. From the viewpoints of the thermal resistance, volatility resistance and non-extractability, it is preferable to add a small amount of high-molecular plasticizer such as polyester plasticizer, polyether plasticizer, polyether-ester plasticizer, liquid nitrile rubber, or the like, each having a molecular weight of no less than 700, to the nitrile rubber. When molding is simple, such plasticizer need not be added.

The coupling agent is selected from the group of aluminum coupling agents, titanate coupling agents and silane coupling agents such as γ-mercaptopropyltrimethoxysilane, γ-glycidoxypropyl-trimethoxysilane, γ-methacryloxypropyltrimethoxysilane or the like.

Moreover, the aforementioned rubber material may contain other compounds such as an antiscorching agent, an organic filler, an inorganic filler, an anti-oxidant, an ultraviolet absorbing agent, a light protecting agent, a heat-resisting stabilizer, a flame retardant, an antistat, a peroxide decomposer, a fluidity improving agent, a tackifier, an anti-tackifier, a releasant, a solid lubricant, a pigment, a dye, and the like.

EXAMPLES

A first experiment using the seals according to the present invention will be described below in detail. In the first experiment the seals are made from the following materials.

Raw Material Rubber:

middle-high-nitrile-containing rubber N230S made by Japan Synthetic Rubber Co., Ltd.

middle-high-nitrile-containing rubber N237 made by Japan Synthetic Rubber Co., Ltd.

age resistor copolymeric middle-high-nitrile-containing rubber N5531 made by Japan Synthetic Rubber Co., Ltd.

Curing Agent:

high-dispersion sulfur SALFAX PMC made by Tsurumi Chemical Industry Ltd.

Vulcanization Accelerator:

dibenzothiazyl disulfide [MBTS] ACCEL DM mady by Kawaguchi Chemical Industry Co., Ltd.

tetraethylthiuram disulfide [TETE] ACCEL TET made by Kawaguchi Chemical Industry Co., Ltd.

tetrabutylthiuram disulfide [TBTD] ACCEL TBT made by Kawaguchi Chemical Industry Co., Ltd.

Vulcanization Accelerator Activator:

zinc oxice (zinc flower) France method No. 1 made by Sakai Chemical Industry Co., Ltd.

stearic acid LUNAC S-35 made by Kao Corp.

Age Resistor:

2,2,4-trimethyl-1,2-dihydroquinoline polymer [TMDQ] NOCRAC 224 made by Ouchi Shinko Chemical Industry Co., Ltd.

N,N'-di-β-naphthyl-P-phenylenediamine [DNPD] NOCRAC White made by Ouchi Shinko Chemical Industry Co., Ltd.

4,4'-bis-(α,α-dimethylbenzyl)diphenylamine [CD] NOCRAC CD made by Ouchi Shinko Chemical Industry Co., Ltd.

2-mercaptobenzimidazole [MBI] NOCRAC MB made by Ouchi Shinko Chemical Industry Co., Ltd.

octylated diphenylamine [ODPA] NOCRAC AD-F made by Ouchi Shinko Chemical Industry co., Ltd.

special was SUNNOC N made by Ouchi Shinko Chemical Industry Co., Ltd.

Reinforcing Agent:

hydrous silica NIPSIL AQ made by Nippon Silica Industrial Co., Ltd.

hydrous silica CARPLEX (registered trademark) #1120 made by Shionogi & Co., Ltd.

Plasticizer:

di-(Z-mthylhexyl) phthalate [DOP] DOP (molecular weight; 391) made by Daihachi Chemical Industry Co., Ltd.

adipate type polyester ADEKACIZER-PN-350 (molecular weight: 3000) made by Asahi Electro-Chemical Co., Ltd.

The aforementioned raw-material rubber, curing agent, vulcanization accelerator, vulcanization accelerator activator, age resistor, reinforcing agent and plasticizer were mixed in the proportions shown in the following Tables 1A and 1B. The mixtures were subjected to vulcanization-molding at 160° C. for 10 minutes by a vulcanization molding machine to prepare test sample pieces for sample Nos. 1-1 to 1-13 of respective compositions, with 2 mm of thickness in accordance with JIS dumbbell shape No. 3.

TABLE 1A (unit: weight part)

| | Sample No. | | | | | |
|---|---|---|---|---|---|---|
| | 1-1 | 1-2 | 1-3 | 1-4 | 1-5 | 1-6 |
| Raw-material rubber | | | | | | |
| N2308 | 100 | | | | | |
| N237 | | | 100 | | | |
| N531 | | 100 | | 100 | 100 | 100 |
| Curing agent | | | | | | |
| High-disp. sulfur | 0.5 | 0.5 | 0.5 | 0.5 | 0.5 | 0.5 |
| Vulcanization accelerator | | | | | | |
| MBTS | 2.0 | 2.0 | 2.0 | 2.0 | 2.0 | 2.0 |
| TETD | 1.0 | 1.0 | 1.0 | 1.0 | 1.0 | 1.0 |
| TBTD | 1.5 | 1.5 | 1.5 | 1.5 | 1.5 | 1.5 |
| Vulcanization accelerator activator | | | | | | |
| Zinc Oxide | 5.0 | 5.0 | 5.0 | 5.0 | 5.0 | 5.0 |
| Stearic acid | 1.0 | 1.0 | 1.0 | 1.0 | 1.0 | 1.0 |
| Reinforcing agent | | | | | | |
| NIPSIL AQ | 55 | | 55 | | | |
| CARPLEX #1120 | | 60 | | 60 | 60 | 60 |
| Age resistor | | | | | | |
| ODPA | | | | | | |
| TMDQ | | | 3.0 | | | |
| DNPD | | 4.0 | | | | |
| CD | 3.0 | | | 3.0 | 0.3 | 5.0 |
| MBI | 3.0 | 3.0 | 3.0 | 3.0 | 0.3 | 5.0 |
| Special wax | 1.0 | 1.0 | 1.0 | 1.0 | 1.0 | 1.0 |
| Plasticizer | | | | | | |
| DOP | | | | | | |
| ADEKACIZER PN350 | 5.0 | 5.0 | 5.0 | 5.0 | 5.0 | 5.0 |

TABLE 1B (unit: weight part)

| | Sample No. | | | | | | |
|---|---|---|---|---|---|---|---|
| | 1-7 | 1-8 | 1-9 | 1-10 | 1-11 | 1-12 | 1-13 |
| Raw-material rubber | | | | | | | |
| N2308 | | 100 | 100 | | 100 | | |
| N237 | | | | 100 | | | |
| N531 | 100 | | | | | 100 | 100 |
| Curing agent | | | | | | | |
| High-disp. sulfur | 0.5 | 0.5 | 0.5 | 0.5 | 0.5 | 0.5 | 0.5 |
| Vulcanization accelerator | | | | | | | |
| MBTS | 2.0 | 2.0 | 2.0 | 2.0 | 2.0 | 2.0 | 2.0 |
| TETD | 1.0 | 1.0 | 1.0 | 1.0 | 1.0 | 1.0 | 1.0 |
| TBTD | 1.5 | 1.5 | 1.5 | 1.5 | 1.5 | 1.5 | 1.5 |
| Vulcanization accelerator activator | | | | | | | |
| Zinc Oxide | 5.0 | 5.0 | 5.0 | 5.0 | 5.0 | 5.0 | 5.0 |
| Stearic acid | 1.0 | 1.0 | 1.0 | 1.0 | 1.0 | 1.0 | 1.0 |
| Reinforcing agent | | | | | | | |
| NIPSIL AQ | | 55 | 55 | | 55 | | |
| CARPLEX #1120 | 60 | | | 60 | | 60 | 60 |
| Age resistor | | | | | | | |
| ODPA | | | 3.0 | | | | |
| TMDQ | 3.0 | | | | | | |
| DNPD | | 3.0 | | 3.0 | | | |
| CD | | | | | 3.0 | 0.2 | 7.0 |

TABLE 1B-continued

| | Sample No. (unit: weight part) | | | | | | |
|---|---|---|---|---|---|---|---|
| | 1-7 | 1-8 | 1-9 | 1-10 | 1-11 | 1-12 | 1-13 |
| MBI | | | | | | 0.2 | 7.0 |
| Special wax | 1.0 | 1.0 | 1.0 | 1.0 | 1.0 | 1.0 | 1.0 |
| Plasticizer | | | | | | | |
| DOP | | | 5.0 | | | | |
| ADEKACIZER PN350 | 5.0 | 5.0 | | 5.0 | 5.0 | 5.0 | 5.0 |

After the respective test sample pieces were subjected to an accelerated air aging test at a test temperature of 130° C. for a test time of 1000 hours on the basis of an accelerated aging test method for vulcanized rubber (normal oven method) in accordance with JIS K 6257, a tensile test was performed to measure tensile strength, tensile stress at 10% strain and elongation at break. Additionally, of an order to examine physical properties of an ordinary state for comparison the respective test sample pieces were subjected to the same tensile test without the accelerated air aging test to measure tensile strength, tensile stress at 10% strain and elongation at break.

<Accelerated Air Aging Test>

Test Method: Normal oven method in accordance with JIS K 6257

Volume Rate of Test Sample to Oven: within 10%

Replacement Times of Air in Oven: 10 times/hour

Average Wind Speed of Air: 0.5±0.1 m/second

Test Temperature: 130° C.

Test Time: 1000 hours

<Tensile Test>

Test Method: Vulcanized rubber tensile test method in accordance with JIS K 6251

Test Speed: 500 mm/min

<Hardness Test>

Test Method: Vulcanized rubber hardness test method in accordance with JIS K 6253

Test Pieces: Three test pieces as described above were used so as to overlap one another Further, the accelerated air aging test is prone to be affected by a ventilation rate (replacement time per hour) of air in an oven during the test. Therefore, in the accelerated air aging test the ventilation rate was controlled to a desired value by a controller of the oven in accordance with an output signal from a watthour meter mounted to the oven. In addition, the ventilation rate was calculated by the following expression (1).

$$N = \frac{3590 (X - Y)}{V \cdot D \cdot \Delta T} \quad (1)$$

N: Ventilation rate (replacement times per hour)
X: Consumed electric energy during ventilation (W•h)
Y: Consumed electric energy during non-ventilation (W•h)
V: Total volume of oven (cm³)
D: Density of air around oven (g/cm³)
ΔT: Difference in temperature between inside and outside of oven (°C)

Figure 2:
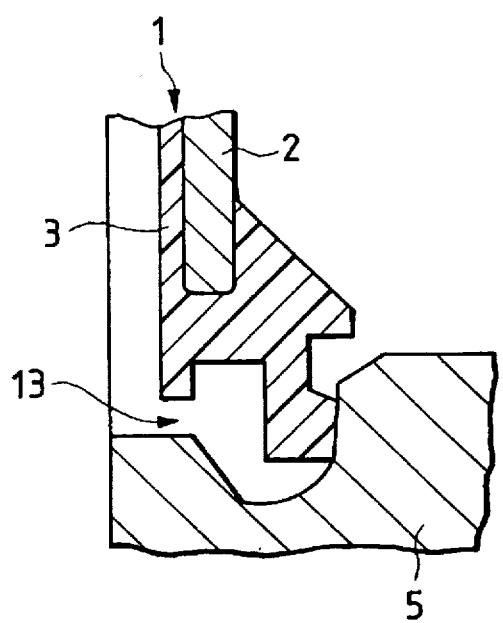
FIG. 2 is a sectional view showing the shape of a lip portion in a rolling bearing seal according to an embodiment of the present invention.

Rubber of a composition shown in each of the sample Nos. 1-1 to 1-13 was unitedly vulcanization-molded in the outside of a SPCC core 2 to form a seal 1 so that a lip portion 13 of an elastic member 3 was formed as shown in FIG. 2. An outer appearance of the seal 1 formed is inspected, and then the seal 1 was assembled between the inner and outer races 5 and 4 of a single-row deep-groove ball bearing of 6203 (designation) made by NSK Ltd. The bearing was subjected to a bearing rotating test machine made by NSK Ltd. so that grease leaking and lip portion breaking were examined after the bearing was rotated at 12000 rpm for 1000 hours.

Enclosed Grease: Ether type grease
Atmospheric Temperature: 140° C.

Results of the aforementioned tests are shown in the following Tables 2A and 2B.

TABLE 2A

| | Sample No. | | | | | |
|---|---|---|---|---|---|---|
| | 1-1 | 1-2 | 1-3 | 1-4 | 1-5 | 1-6 |
| Physical properties in ordinary state | | | | | | |
| Hardness (type A durometer) | 67 | 69 | 70 | 68 | 69 | 70 |
| Tensile strength (MPa) | 13.5 | 14.8 | 18.9 | 13.5 | 14.2 | 12.7 |
| Elongation at break (%) | 640 | 670 | 510 | 720 | 760 | 650 |
| Tensile stress at 10% strain (MPa) | 0.60 | 0.68 | 0.85 | 0.73 | 0.75 | 0.75 |
| Physical properties after accelerated air aging test | | | | | | |
| Hardness (type A durometer) | 93 | 91 | 92 | 88 | 93 | 88 |
| Tensile strength (MPa) | 14.1 | 10.2 | 12.5 | 17.1 | 15.9 | 18.1 |
| Elongation at break (%) | 55 | 60 | 50 | 70 | 52 | 75 |
| Tensile stress at 10% strain (MPa) | 5.0 | 3.5 | 4.0 | 2.7 | 4.3 | 2.5 |
| Outside appearance of seal | good | good | good | good | good | good |
| Grease leaking | no | no | no | no | no | no |
| Seal lip breaking | no | no | no | no | no | no |

TABLE 2B

| | Sample No. | | | | | | |
|---|---|---|---|---|---|---|---|
| | 1-7 | 1-8 | 1-9 | 1-10 | 1-11 | 1-12 | 1-13 |
| Physical properties in ordinary state | | | | | | | |
| Hardness (type A durometer) | 65 | 70 | 72 | 69 | 71 | 70 | 69 |
| Tensile strength (MPa) | 14.5 | 14.2 | 13.5 | 13.2 | 16.5 | 14.0 | 11.8 |
| Elongation at break (%) | 650 | 620 | 560 | 620 | 530 | 730 | 610 |
| Tensile stress at 10% strain (MPa) | 0.62 | 0.69 | 0.86 | 0.80 | 0.85 | 0.74 | 0.77 |
| Physical properties after accelerated air aging test | | | | | | | |
| Hardness (type A durometer) | 91 | 89 | 94 | 90 | 92 | 94 | 88 |
| Tensile strength (MPa) | 13.5 | 10.8 | 12.5 | 9.5 | 10.1 | 16.2 | 17.8 |
| Elongation at break (%) | 65 | 32 | 24 | 59 | 49 | 30 | 73 |
| Tensile stress at 10% strain (MPa) | 5.2 | 3.9 | 5.8 | 5.1 | 4.0 | 5.9 | 2.6 |
| Outside appearance of seal | good | good | good | good | good | good | good |
| Grease leaking | yes | no | yes | yes | no | yes | no |
| Seal lip breaking | no | yes | yes | no | yes | yes | no |

It is apparent from the results of Table 2A that neither grease leaking nor lip portion breaking occurred in samples Nos. 1-1 to 1-6 which contain 2-mercaptobenzimidazole (MBI) as the secondary age resistor and whose tensile stress at 10% strain and elongation at break fall within the range of the present invention. In particular, sample Nos. 1-1 and 1-4 to 1-6 developed the superior thermal resistance in which 4,4'-bis(α,α-dimethylbenzyl)diphenylamine (CD) was mixed with MBI as the age resistor even though it was a small amount of CD such as 0.3 weight part in sample No. 1-5, compared with sample Nos. 1-2 and 1-3 mixing the age resistor except for CD with MBI.

On the contrary, as shown in Table 2B, grease leaking occurred in sample Nos. 1-7, 1-9, 1-10 and 1-12 each of whose tensile stress at 10% strain was beyond the range of the present invention. Further, lip portion breaking occurred in sample Nos. 1-8, 1-9, 1-11 and 1-12 each of whose elongation at break was out of the range of the present invention. Moreover, sample No. 1-12 had the inferior thermal resistance due to an extremely small content of mixtures of the age resistor in spite of the same mixing combination of CD and MBI as sample Nos. 1-1 and 1-4 to 1-6. Therefore, both of grease leaking and lip portion breaking occurred early in sample No. 1-12. On the other hand, neither grease leaking nor lip portion breaking occurred in sample No. 1-13; however, due to an extremely large content of mixtures of the age resistors CD and MBI, sample No. 13 suffered leaking of grease and deteriorating of an outside appearance of the seal due to flocculation of the rubber.

It is further apparent from the results of Tables 2A and 2B that the results of grease leaking and lip portion breaking varied even in the case where the measured values of hardness were equal to each other, and that it was difficult to determine the characteristic of the seal lips under such a high-temperature environment by hardness such as durometer hardness, or the like.

Next, a second experiment using the seals according to the present invention will be described below in detail. In the second experiment γ-mercaptopropyltrimethoxysilane TSL8350 made by Toshiba Silicon Co., Ltd. was employed as a coupling agent. The raw-material rubber, curing agent, vulcanization accelerator, vulcanization accelerator activator, age resistor, reinforcing agent and plasticizer described in the aforementioned first experiment and the coupling agent were mixed in the proportions shown in the following Table 3. The mixtures were vulcanization-molded at 160° C. for 10 minutes by a vulcanization-molding machine to prepare test sample pieces in the same manner as described above for sample Nos. 2-1 to 2-6 of respective compositions.

TABLE 3

| | | | Sample No. | | | (unit: weight part) |
|---|---|---|---|---|---|---|
| | 2-1 | 2-2 | 2-3 | 2-4 | 2-5 | 2-6 |
| Raw-material rubber | | | | | | |
| N237 | 100 | | | | 100 | |
| N531 | | 100 | 100 | 100 | | 100 |
| Curing agent | | | | | | |
| High-disp. sulfur | 0.5 | 0.5 | 0.5 | 0.5 | 1.5 | 0.5 |
| Vulcanization accelerator | | | | | | |
| MBTS | 2.0 | 2.0 | 2.0 | 2.0 | 1.5 | 2.0 |
| TETD | 1.0 | 1.0 | 1.0 | 1.0 | | 1.0 |
| TBTD | 1.5 | 1.5 | 1.5 | 1.5 | | 1.5 |

TABLE 3-continued

| | | | Sample No. | | | (unit: weight part) |
|---|---|---|---|---|---|---|
| | 2-1 | 2-2 | 2-3 | 2-4 | 2-5 | 2-6 |
| Vulcanization accelerator activator | | | | | | |
| Zinc oxide | 5.0 | 5.0 | 5.0 | 5.0 | 5.0 | 5.0 |
| Stearic acid | 1.0 | 1.0 | 1.0 | 1.0 | 1.0 | 1.0 |
| Reinforcing agent | | | | | | |
| CARPLEX #1120 | 60 | 60 | 60 | 60 | 60 | 60 |
| Age resistor | | | | | | |
| CD | 3.0 | 3.0 | 3.0 | 3.0 | 3.0 | 7.0 |
| MBI | 3.0 | 3.0 | 3.0 | 3.0 | 3.0 | 7.0 |
| Special wax | 1.0 | 1.0 | 1.0 | 1.0 | 1.0 | 1.0 |
| Plasticizer | | | | | | |
| ADEKACIZER PN350 | 5.0 | 5.0 | 5.0 | 5.0 | 5.0 | 5.0 |
| Coupling agent | | | | | | |
| γ-mercapto propyl trimethoxy silane | 1.0 | 1.0 | 2.0 | | | 2.0 |

The respective test pieces were subjected to the tests of physical properties in ordinary state, physical properties after air aging and grease leaking and the lip portion breaking in the same manner as the first experiment and further subjected to a compression set test and a dust environment life test by the following method.

<Compression Set Test>

Test Method: Compression set test method of vulcanized rubber in accordance with JIS K 6262

Dimensions of Test Piece: Diameter 29.0 mm and Thickness 12.5 mm

Thickness of Spacer: 9.38 mm

Test Temperature: 130° C.

Test Time: 70 hours

Further, the compression set was calculated by the following expression (2).

$$C_S = \frac{(t_0 - t_1)}{(t_0 - t_2)} \times 100 \quad (2)$$

$C_S$: Compression set (%)
$t_0$: Original thickness (mm) of the test piece
$t_1$: Thickness (mm) of the test piece with the passage of 30 minutes after the test piece was taken out of the compression apparatus
$t_2$: Thickness (mm) of spacer <Dust Environment Life Test>

In each of sample Nos. 2-1 to 2-6 of respective compositions, the rolling bearing seal 1 which was formed so that the lip portion 13 was shaped as shown in FIG. 2 was assembled in a single-row deep-groove ball bearing of 6203 (designation) made by NSK Ltd. in the same manner as described above. The bearing was subjected to a dust environment life test machine made by NSK Ltd. so that the test was performed in the following condition.

Rotational Speed: 3000 rpm
Quantity of Dust: 200 g/box
Test Time: 1000 hours
Enclosed Grease: Ether type grease
Atmospheric Temperature: 130° C.

Results of the tests were shown in the following Table 4.

TABLE 4

| | Sample No. | | | | | |
|---|---|---|---|---|---|---|
| | 2-1 | 2-2 | 2-3 | 2-4 | 2-5 | 2-6 |
| Physical properties in ordinary state | | | | | | |
| Hardness (type A durometer) | 69 | 71 | 70 | 68 | 72 | 68 |
| Tensile strength (MPa) | 16.5 | 14.5 | 16.2 | 14.1 | 15.3 | 13.5 |
| Elongation at break (%) | 570 | 550 | 560 | 730 | 750 | 520 |
| Tensile stress at 10% strain (MPa) | 0.83 | 0.77 | 0.85 | 0.75 | 0.72 | 0.76 |
| Physical properties after accelerated air aging test | | | | | | |
| Hardness (type A durometer) | 90 | 87 | 86 | 93 | 92 | 87 |
| Tensile strength (MPa) | 13.1 | 12.5 | 16.3 | 11.1 | 13.8 | 12.8 |
| Elongation at break (%) | 56 | 58 | 72 | 70 | 61 | 69 |
| Tensile stress at 10% strain (MPa) | 4.2 | 3.9 | 3.3 | 3.8 | 4.8 | 2.8 |
| Compression set (%) | 35 | 33 | 25 | 36 | 47 | 39 |
| Evaluation of sealing performance | | | | | | |
| Grease leaking | no | no | no | no | no | no |
| Seal lip breaking | no | no | no | no | no | no |
| Dust environment life (Hr) | ≧1000 | ≧1000 | ≧1000 | 620 | 340 | 600 |

It is apparent from the results of Table 4 that the dust environment life in each of sample Nos. 2-1 to 2-3 was not shorter than 1000 hours because the compression set was in a range of from 0 to 35% whereas the dust environment life in each of sample Nos. 2-4 and 2-6 was short extremely because the compression set was out of the range described above.

In particular, since the sample No. 2-6 had 7.0 weight parts of considerably large mixing contents of CD and MBI employed as the age resistor, compared with the other samples, the compression set was increased and the dust environment life was short.

Accordingly, in the rolling bearing seal in which the compression set in the compression set test is in a range of from 0 to 35%, the life of a rolling bearing to which the seal is attached can be elongated in the case where the bearing is used in an environment in which a great deal of dust is present.

As described above, according to the seal for the rolling bearing according to the present invention, there is no possibility of leaking grease enclosed in a bearing or breaking a lip portion even in the case where the bearing is used in a high-temperature environment. Accordingly, high reliability is secured.

What is claimed is:

1. A seal for a rolling bearing, comprising:

a molding member formed from a rubber material, the molding member including a lip portion, the rubber material from which the molding member is formed having the following properties: 0.3 to 5.0 MPa of tensile stress at 10% strain and no less than 50% of elongation at break after the rubber material has been subjected to an accelerated air aging at 130° C. for 1000 hours.

2. The seal of claim 1, wherein the rubber material comprises nitrile rubber compound.

3. The seal of claim 2, wherein the nitrile rubber compound contains acrylonitrilebutadiene polymer, with respect to 100 weight parts of the acrylonitrilebutadiene polymer, 0.3 to 5.0 weight parts of an age resistor of 4,4'-bis($\alpha,\alpha$-dimethylbenzyl)diphenylamine, and 0.3 to 5.0 weight parts of at least one secondary age resistor selected from the group consisting of 2-mercaptobenzimidazole, 2-mercaptomethylbenzimidazole, zinc salt of 2-mercaptobenzimidazole, and zinc salt of 2-mercaptomethylbenzimidazole.

4. The seal of claim 1, wherein the accelerated air aging is performed at a ventilation rate of 10 times per hour.

* * * * *